April 28, 1925.
W. C. TRACY
FILTER
Filed Sept. 27, 1921    2 Sheets-Sheet 2
1,535,750
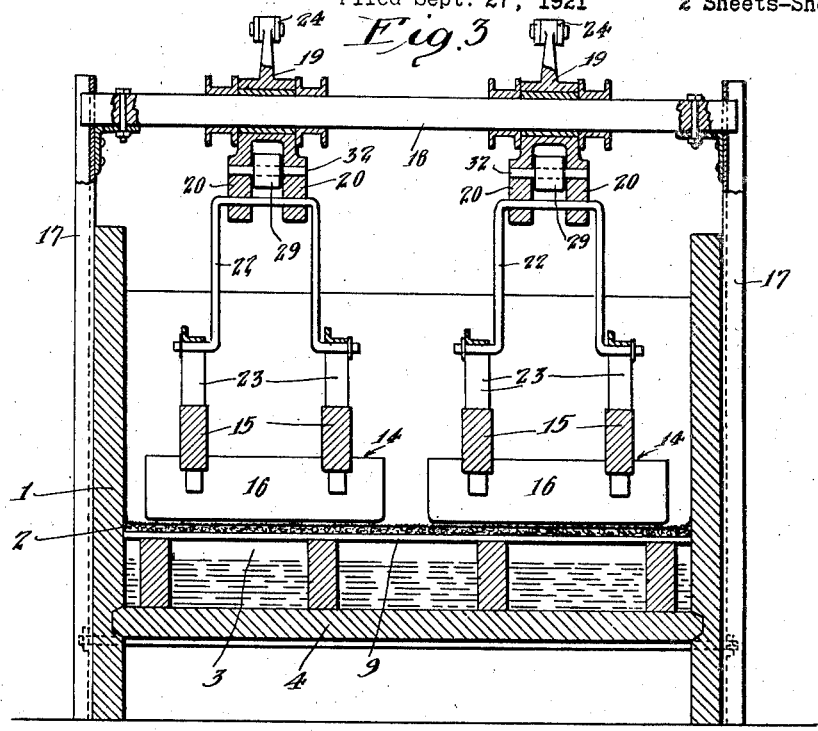
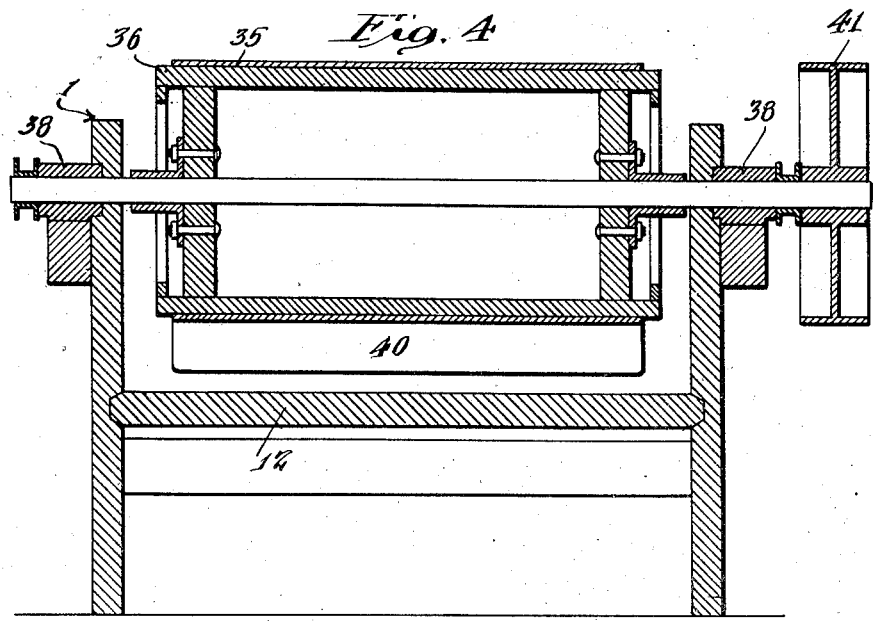
Inventor
Warren C. Tracy
By Lyon & Lyon
attys Patented Apr. 28, 1925.

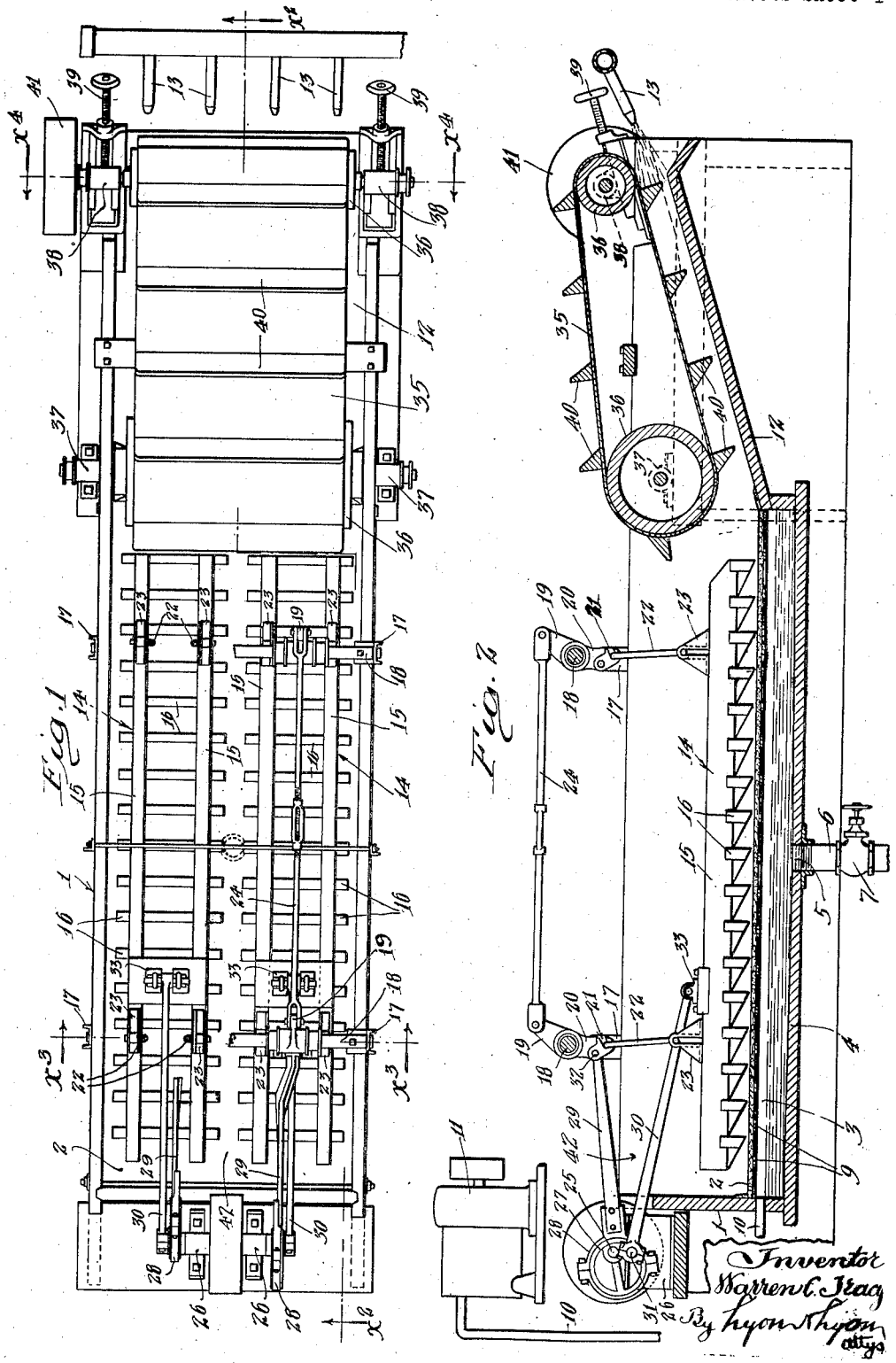

1,535,750

UNITED STATES PATENT OFFICE.

WARREN C. TRACY, OF LOS ANGELES, CALIFORNIA.

FILTER.

Application filed September 27, 1921. Serial No. 503,561.

*To all whom it may concern:*

Be it known that I, WARREN C. TRACY, a citizen of the United States, residing at Los Angeles, in the county of Los Angeles and State of California, have invented new and useful Improvements in Filters, of which the following is a specification.

This invention relates to filters and is particularly directed to a filter for effecting a separation of ore solutions from tailings in the treatment of ore pulp.

An object of the invention is to provide a filter for separating ore solutions from tailings by propelling the pulp along a filter element in a filtering operation.

Another object is to provide a mechanism which propels the pulp along the filter element in stepped movements.

Another object is to provide a means for effecting a discharge of the tailings and to wash the tailings of any adhering solution.

A further object is to provide means maintaining a partial vacuum functioning to promote a rapid filtration, and to provide a means for discharging the separated ore solution.

Various other objects and advantages will be more fully apparent from the following description of the accompanying drawings which form a part of this disclosure, and which illustrate a preferred form of embodiment of the invention.

Of the drawings:

Fig. 1 is a plan view of the filter.

Fig. 2 is a longitudinal section on line $x^2$—$x^2$ of Fig. 1.

Fig. 3 is a transverse section on line $x^3$—$x^3$ of Fig. 1.

Fig. 4 is a transverse section on line $x^4$—$x^4$ of Fig. 1.

The filter as illustrated comprises a tank 1 having a horizontal filter element 2 defining a solution receiving chamber 3 in the bottom portion of the tank. Said chamber has a floor 4 sloping to a discharge port 5 communicating with a discharge pipe 6 having a valve 7 by which the rate of discharge is controlled. The structure of the filtering element preferably consists of a coco-mat supported upon stationary slats 9 and covered by a sheet of fabric. A pipe 10 communicates with the upper portion of the chamber 3 and connects with a vacuum pump, indicated at 11 and which may be of any desired or well known type.

The tank has a floor board 12 angled upwardly from the end of the filter element, and defining a tailings discharge chute, and for the purpose of washing any adhering ore solution from the tailings I provide water jets 13 directing water downwardly along the chute.

The mechanism for propelling the pulp along the filter element comprises two similar propelling members 14 transversely adjacent each other and positioned just above the filter element. Each propelling member is formed of two relatively spaced side rails 15 joined together by transverse cross-bars 16 which extend below said rails and engage and propel the ore pulp when the propelling member is in operation. Reinforcing channel irons 17 extend upwardly above the top of the tank and support relatively spaced journal rods 18 from which are suspended the respective propelling members. The suspending means for each of the members 14 consists of rocker arms 19 each journaled on one of the rods 18 and having a lower bifurcated end (see Fig. 3) with each furcation 20 provided with an angled notch 21 receiving the medial portion of a bail 22. The free ends of each bail are pivotally connected with brackets 23 secured to the respective side rails 15 of the propelling member.

The upper ends of the rocker arms 19 associated with each propelling member are connected by a link 24 so that they move in unison.

A drive shaft 25 is journaled in brackets 26 and is provided with a suitable drive pulley or other suitable element which is in driving connection with any suitable source of power. The mechanism for driving each of the propelling members comprises an eccentric 27 fixed on the shaft 25, a cooperating eccentric strap 28 carried by an arm 29, and a connecting rod 30 journaled on a stud 31 eccentrically positioned on the eccentric 27. The opposite end of the arm 29 is positioned between the furcations 20 of the rocker arm 19, and is pivotally connected thereto at 32, and the rod 30 is pivotally connected to a bracket 33 on the propelling member.

This mechanism produces a movement of the propelling members which is more or less vertically elliptical and propels the ore pulp along the filter element in stepped movements.

From the discharge end of the filter element the tailings are propelled upwardly along the discharge chute by a belt conveyor 35 consisting of two rotary members 36 rotatably supported in journal brackets 37—38 with the brackets 38 provided with translating means 39 functioning as means for tightening the conveyor belt 35. The belt 35 has transverse cleats 40 and the conveyor is continuously driven by suitable driving mechanism connected with a belt pulley 41 on the shaft of one of the members 36.

One of the uses for which the filter of the present invention is adapted is the filtering of copper solution from copper ore pulp as it comes from a leaching apparatus wherein crushed ore has been subjected to the action of a leaching solution. This treated ore, which has herein been defined as ore pulp, is fed into the receiving end of the filter approximately at 42 (see Figs. 1 and 2) and is propelled along the filter element in stepped movements by the propelling members 14, the ore solution filtering through said element, assisted by the partial vacuum in the receiving chamber 3. When the tailings arrive at the opposite end of the filter element they are continuously propelled up the discharge chute by the belt conveyor, the water jets washing the tailings and preventing any adhering ore solution being discharged with the tailings.

To prevent the level of the ore solution in the tank 3 reaching above the vacuum line 10, the discharge valve 7 is regulated coincident to the rate of filtration.

Having described my invention, I claim:

1. In a filter of the nature disclosed, a tank, a filter element defining a lower chamber for receiving ore solution, a discharge chute extending and angled upwardly from one end of the filter element, means propelling ore pulp along said element towards the discharge chute, and means propelling the ore tailings upwardly along the discharge chute.

2. In a filter of the nature disclosed, a tank, a filter element defining a lower chamber for receiving ore solution, a discharge chute extending and angled upwardly from one end of the filter element, means propelling ore pulp along said element towards the discharge chute, means propelling the ore tailings upwardly along the discharge chute, and means washing the tailings on the chute before discharge from the filter.

3. In a filter of the nature disclosed, a tank, a filter element defining a lower chamber for receiving ore solution, a discharge chute extending and angled upwardly from one end of the filter element, means propelling ore pulp along said element towards the discharge chute, means propelling the ore tailings upwardly along the discharge chute, means maintaining a partial vacuum in the solution chamber, and means discharging the solution from the chamber.

4. In a filter of the nature disclosed, a tank, a filter element defining a lower chamber for receiving ore solution, a discharge chute extending and angled upwardly from one end of the filter element, means propelling ore pulp along said element towards the discharge chute, means propelling the ore tailings upwardly along the discharge chute, means washing the tailings on the chute before discharge from the filter, means maintaining a partial vacuum in the solution chamber, and means discharging the solution from the chamber.

5. In a filter of the nature disclosed, a tank, a filter element defining a lower chamber for receiving ore solution, a discharge chute extending and angled upwardly from one end of the filter element, means for propelling ore pulp along said element in stepped movements, and means continuously propelling the tailings along the discharge chute.

6. In a filter of the nature disclosed, an elongated flat filter element, means for propelling ore from one end towards the other end, a discharge chute upwardly inclined therefrom providing a back drain for the ore solution to said filter element, and means for propelling said ore upwardly along said discharge chute as fed from said first propelling means.

Signed at Los Angeles, California, this 21st day of September 1921.

WARREN C. TRACY.

Witnesses:
 CLARENCE B. FOSTER,
 L. BELLE WEAVER.